United States Patent
Lucas et al.

(10) Patent No.: US 9,834,320 B2
(45) Date of Patent: Dec. 5, 2017

(54) AIRCRAFT AND EXTERIOR SPEAKER SYSTEMS FOR AIRCRAFT

(71) Applicant: Gulfstream Aerospace Corporation, Savannah, GA (US)

(72) Inventors: Michael Lucas, Savannah, GA (US); Michael Brinley, Savannah, GA (US); Kristopher Lynch, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 91 days.

(21) Appl. No.: 14/697,895

(22) Filed: Apr. 28, 2015

(65) Prior Publication Data

US 2016/0318627 A1    Nov. 3, 2016

(51) Int. Cl.
| | |
|---|---|
| *B64D 47/02* | (2006.01) |
| *H04R 7/04* | (2006.01) |
| *B64D 45/00* | (2006.01) |
| *G10K 9/20* | (2006.01) |

(52) U.S. Cl.
CPC ............ *B64D 47/02* (2013.01); *B64D 45/00* (2013.01); *G10K 9/20* (2013.01); *B64D 2045/0095* (2013.01); *G10K 2210/1281* (2013.01); *H04R 7/045* (2013.01)

(58) Field of Classification Search
CPC ...... B64D 15/163; B64D 47/02; B64D 47/06; B06B 1/0622; G01N 2291/2694; H04R 7/045; H04R 9/066
See application file for complete search history.

(56) References Cited

U.S. PATENT DOCUMENTS

| | | | |
|---|---|---|---|
| 2006/0287829 A1 | 12/2006 | Pashko-Paschenko | |
| 2010/0119095 A1* | 5/2010 | Grenzing | H04R 7/045 381/332 |
| 2015/0200351 A1* | 7/2015 | Zawada | H01L 41/183 252/62.9 PZ |

FOREIGN PATENT DOCUMENTS

| | | |
|---|---|---|
| EP | 1024053 A2 | 8/2000 |
| WO | 9716048 A1 | 5/1997 |

OTHER PUBLICATIONS

Dayton Audio, DAEX19QLP-4 Quad Feet Low Profile 19mm Exciter, Product Overview, Mar. 10, 2015.
National Institute of Industrial Property, Office Action in France Patent Application No. 16 53473 mailed Sep. 9, 2016.
USPTO, U.S. Appl. No. 14/599,758, filed Jan. 19, 2015.
German Patent and Trade Mark Office, Search Report for German Patent Application No. 10 2016 107 322.0 dated Jan. 9, 2017.

* cited by examiner

*Primary Examiner* — Matthew Eason
(74) *Attorney, Agent, or Firm* — LKGlobal | Lorenz & Kopf LLP

(57) ABSTRACT

Aircraft, aircraft exterior speaker systems, and methods of projecting sound waves from an exterior of an aircraft are provided. An aircraft includes an outer skin membrane, a vibration actuator, and a controller. The outer skin membrane has an exterior surface that defines an exterior boundary of the aircraft. The vibration actuator is coupled for common vibration with the outer skin membrane. The controller is operatively coupled with the vibration actuator and is configured to generate a command for the vibration actuator based on audible content to be projected from the exterior surface. The controller is further configured to (Continued)

transmit the command to the vibration actuator. The vibration actuator is configured to vibrate in response to receiving the command.

11 Claims, 3 Drawing Sheets

AIRCRAFT AND EXTERIOR SPEAKER SYSTEMS FOR AIRCRAFT

TECHNICAL FIELD

The technical field relates generally to aircraft with exterior speakers, and more particularly relates to aircraft with exterior speakers that include vibration actuators coupled with outer skin membranes of the aircraft.

BACKGROUND

A conventional passenger aircraft includes skin membranes that define an outer periphery of the aircraft. These conventional aircraft typically do not include exterior audio speakers due to the difficulties of incorporating conventional audio speakers in the aircraft. For example, a conventional speaker may be mounted outside of the skin membrane, but such an arrangement increases aerodynamic drag and reduces the range/efficiency of the aircraft. Similarly, such conventional speakers may be mounted inside of the skin membrane, but an aperture is needed to expose the conventional speaker cone to the environment. Such apertures are difficult to create and reduce the structural integrity of the skin membrane. Furthermore, these conventional speakers are typically unable to withstand the environmental and operating conditions of aircraft.

As such, it is desirable to provide aircraft and aircraft exterior speakers that do not increase drag or require additional skin membrane apertures. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft and aircraft exterior speaker systems are disclosed herein.

In a first non-limiting embodiment, an aircraft includes, but is not limited to, an outer skin membrane, a vibration actuator, and a controller. The outer skin membrane has an exterior surface that defines an exterior boundary of the aircraft. The vibration actuator is coupled for common vibration with the outer skin membrane. The controller is operatively coupled with the vibration actuator and is configured to generate a command for the vibration actuator based on audible content to be projected from the exterior surface. The controller is further configured to transmit the command to the vibration actuator. The vibration actuator is configured to vibrate in response to receiving the command.

In a second non-limiting embodiment, an aircraft exterior speaker system includes, but is not limited to, an outer skin membrane, a vibration actuator, and a controller. The outer skin membrane has an exterior surface configured to define an exterior boundary of a portion of an aircraft. The vibration actuator is coupled for common vibration with the outer skin membrane and the vibration actuator is an electromagnetic driver or a piezo electric actuator. The controller is operatively coupled with the vibration actuator and is configured to generate a command for the vibration actuator based on audible content to be projected from the exterior surface. The controller is further configured to transmit the command to the vibration actuator. The vibration actuator is further configured to vibrate in response to receiving the command.

In a third non-limiting embodiment, method of projecting sound waves from an exterior of an aircraft includes, but is not limited to, receiving input from a plurality of sensors and generating commands for a vibration actuator. The commands are received at a controller from a plurality of sensors of the aircraft. The commands are generated for a vibration actuator coupled for common vibration with an outer skin membrane of the aircraft. The commands are further generated based on audible content to be projected from an exterior surface of the outer skin membrane. The commands are further generated based on the input received from the plurality of sensors.

BRIEF DESCRIPTION OF THE DRAWINGS

Advantages of the present invention will be readily appreciated, as the same become better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft and aircraft exterior speaker systems are disclosed herein. In some embodiments, the aircraft includes a vibration actuator (e.g., electromagnetic driver coils, piezoelectric actuators) attached to a skin membrane of the aircraft. The vibration actuator is inboard of the exterior surface of the skin membrane so that no apertures or external protrusions are required for installation of the vibration actuator. A controller sends commands to the vibration actuator to cause the skin membrane to vibrate according to a desired audible content. The vibrations of the skin membrane couple with air in the environment around the aircraft to create sound audible to people near the aircraft. Accordingly, the aircraft and aircraft speaker systems permit the aircraft skin membrane to act as a speaker cone without the drawbacks associated with installation of conventional exterior speakers. A greater understanding of the aircraft and aircraft exterior speaker systems may be obtained through a review of the illustrations accompanying this application together with a review of the detailed description that follows.

Figure 1:
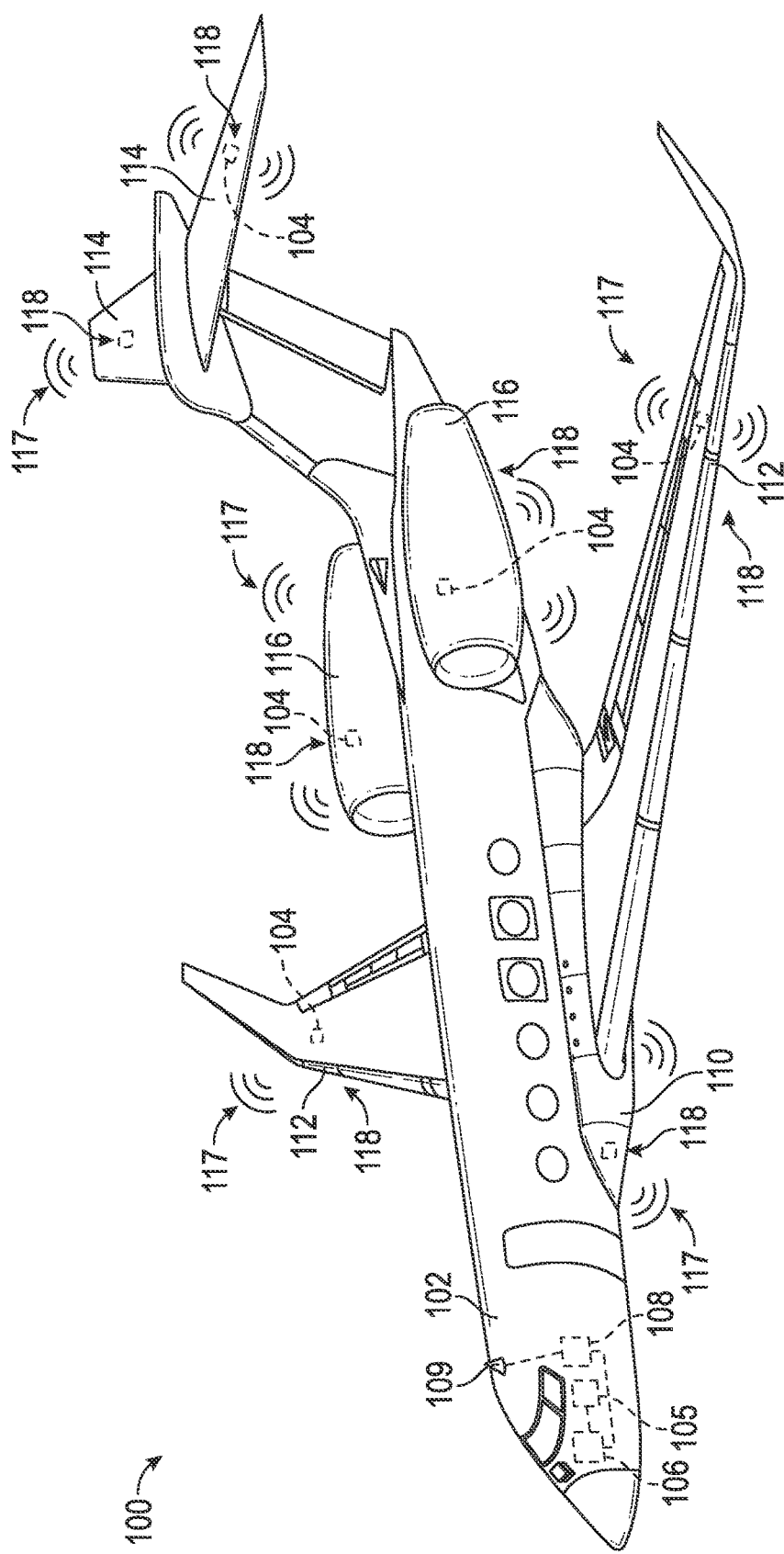
FIG. 1 is a perspective view illustrating a non-limiting embodiment of an aircraft in accordance with the teachings of the present disclosure.

FIG. 1 is an isometric view illustrating a non-limiting embodiment of an aircraft 100 in accordance with the teachings of the present disclosure. Aircraft 100 includes an outer skin membrane 102, exterior speaker vibration actuators 104, an amplifier 105, a controller 106, a plurality of sensors 108, and a remote communication device 109. Outer skin membrane 102 has an exterior surface that defines an exterior boundary of aircraft 100 that contacts an external airflow as aircraft 100 flies through the air. In the example provided, some portions of outer skin membrane 102 are formed from aluminum sheets and some portions of outer skin membrane 102 are formed from composite materials. It should be appreciated that other materials suitable for flight may be incorporated without departing from the scope of the present disclosure. Outer skin membrane 102 defines an exterior surface of various parts of aircraft 100, such as a wing-to-body fairing 110, wings 112, horizontal stabilizers 114, and engine cowlings 116, as will be appreciated by those with ordinary skill in the art.

Vibration actuators 104 may be any vibration actuator that is capable of exciting outer skin membrane 102 to radiate sound outside aircraft 100. For example, vibration actuators 104 may be an electromagnetic driver or a piezo electric actuator. In the example provided, vibration actuators 104 are panel drivers such as the DAEX30HESF-4 model exciter available from DAYTON AUDIO in Springboro, Ohio. Vibration actuators 104 receive signals from controller 106. The signals include instructions that correspond with the audible content that a user desires to project as audible compression waves 117 from aircraft 100.

Vibration actuators 104 are coupled for common vibration with outer skin membrane 102 to define exterior speaker portions 118. As used herein, the term "coupled for common vibration" is defined as the coupling of outer skin membrane 102 with the driven portion of vibration actuators 104 such that these two components vibrate together substantially as a single component. This coupling results in excitation of skin membrane 102 with frequency content substantially similar to the frequency of excitation of the driven portion of vibration actuators 104 by controller 106. Vibration actuators 104 may be rigidly bonded, riveted, adhered, screwed, or otherwise fastened or secured to skin membrane 102. In some embodiments, vibration actuators 104 may be attached to a plate that is secured to skin membrane 102. In some embodiments, vibration actuators 104 may be embedded in a composite material. In the example provided, vibration actuators 104 are mounted so that the driven portion of vibration actuators 104 actuates normal to skin membrane 102.

In the example provided, exterior speaker portions 118 are portions of wing-to-body fairing 110, wings 112, horizontal stabilizers 114, and engine cowlings 116. It should be appreciated that exterior speaker portions 118 may be incorporated at other portions of aircraft 100 without departing from the scope of the present disclosure. The placement of speaker portions 118 in any given aircraft may be influenced by the skin membrane 102 material at the portion, whether the portion is a flammable fluid zone, whether power or wiring is readily available at the portion, or other such considerations. For example, portions of skin membrane 102 that are composite material and that do not define a flammable fluid zone are well suited for exterior speaker portions 118. The mechanical resistance of a composite is typically lower than the mechanical resistance of aluminum, so the energy requirement for actuation of a composite material is typically less than the energy requirement for actuation of an aluminum material.

Figure 2:
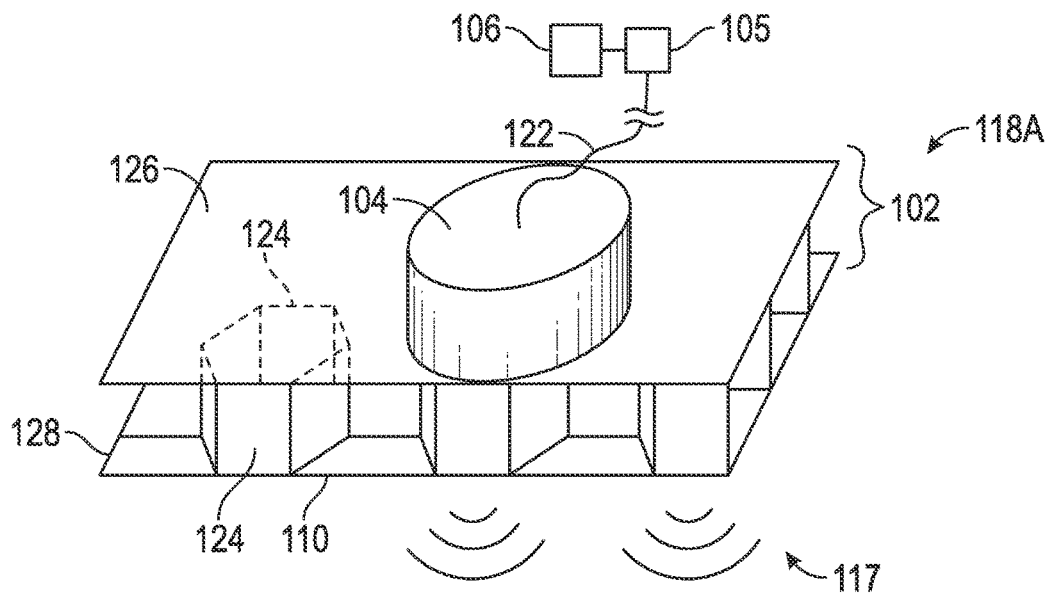
FIGS. 2 and 3, are perspective views illustrating non-limiting embodiments of exterior speaker portions from the aircraft illustrated in FIG. 1 in accordance with the teachings of the present disclosure.

Referring now to FIG. 2, a non-limiting example of an exterior speaker portion 118A is shown in a cross-sectional view. In the example provided, exterior speaker portion 118A is incorporated at wing-to-body fairing 110. Outer skin membrane 102 at exterior speaker portion 118A is a honeycomb composite material. The honeycomb composite material includes at least one layer of repeating columnar hexagonal cells 124 sandwiched between an inner layer 126 and an outer layer 128. Inner layer 126 defines an interior cavity of aircraft 100, such as an inside of wing-to-body fairing 110. Outer layer 128 defines the external surface of skin membrane 102 that is exposed to the environment.

Vibration actuator 104 of exterior speaker portion 118A is secured to an interior surface of inner layer 126 of skin membrane 102. For example, vibration actuator 104 may be secured to inner layer 126 with a layer of adhesive. A control wire or interconnect 122 is connected between vibration actuator 104 and amplifier 105 for receiving amplified sound content signals from controller 106.

Figure 3:
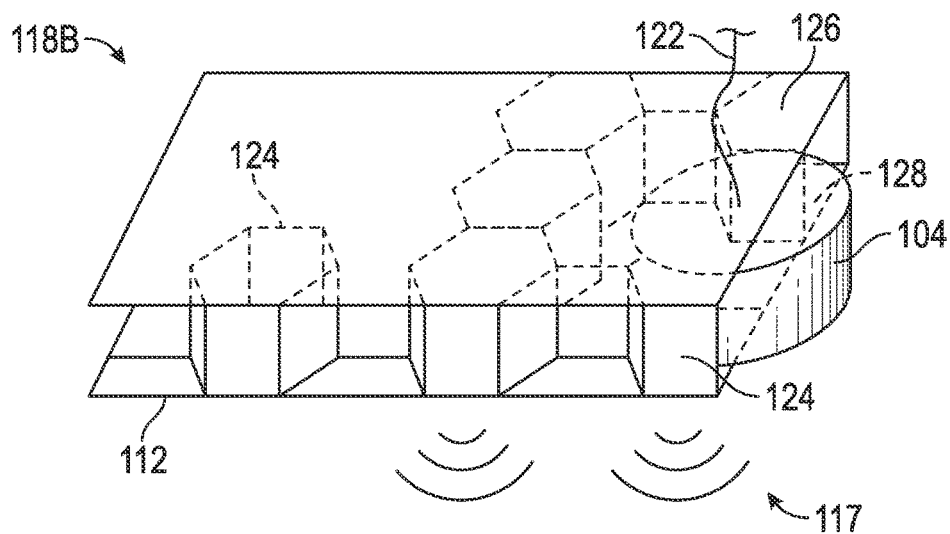

Referring now to FIG. 3, a non-limiting example of an exterior speaker portion 118B is shown in a cross-sectional view. In the example provided, exterior speaker portion 118B is incorporated at wings 112 and horizontal stabilizers 114. Exterior speaker portion 118B is similar to exterior speaker portion 118A, where like numbers refer to like components. Vibration actuator 104 of exterior speaker portion 118B, however, is embedded within a hexagonal cell or cells 124. For example, vibration actuator 104 may be placed inside hexagonal cell 124 during layup of the composite material, and cured in place during the manufacturing of outer skin membrane 102.

Figure 4:
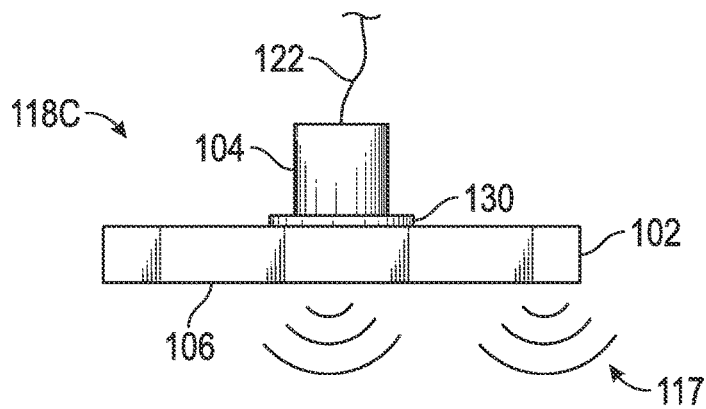
FIG. 4 is a side view illustrating a non-limiting embodiment of the exterior speaker portion of the aircraft illustrated in FIG. 1.

Referring now to FIG. 4, a non-limiting example of an exterior speaker portion 118C is shown in a cross-sectional view. In the example provided, exterior speaker portion 118C is incorporated at engine cowlings 116. Exterior speaker portion 118C is similar to exterior speaker portion 118A, where like numbers refer to like components. Skin membrane 102, however, is formed from an aluminum material and vibration actuator 104 is secured to a plate 130. Membrane 102 may be any type of metal or laminate material. Plate 130 is then secured to skin membrane 102. Plate 130 may be any material and shape suitable for mounting vibration actuator 104 to skin membrane 102.

It should be appreciated that any of the configurations of exterior speaker portions 118A-C may be incorporated in any portion of aircraft 100 without departing from the scope of the present disclosure. For example, any of exterior speaker portions 118A-C may be located at any of the portions defining wings 112, horizontal stabilizers 114, engine cowlings 116, or wing-to-body fairing 118.

Amplifier 105 receives audio signals generated by controller 106 and amplifies the audio signals to a level sufficient to drive vibration actuators 104 with enough power to cause outer skin membrane 102 to radiate compression waves 117 corresponding with the audio signals. Amplifier 105 is coupled with a power source (not illustrated) and with controller 106. In some embodiments, one amplifier 105 is centrally located in aircraft 100 to power multiple vibration actuators 104. In such single amplifier 105 embodiments, separate speaker wires are connected between the amplifier 105 and each vibration actuator. In some embodiments, separate amplifiers 105 are located near each vibration actuator 104 to reduce speaker wire runs through aircraft 100 and utilize existing wiring capable of carrying digitized audio signals. In some embodiments, audio signals are sent wirelessly to amplifiers 105, which may receive power from nearby components. For example, amplifiers 105 in wings 112 may tap into power lines for lights on wings 112.

Controller 106 is operatively coupled with vibration actuator 104 through amplifier 105 using interconnect 122. Controller 106 is configured to generate commands for vibration actuator 104 based on audible content to be projected to the exterior of aircraft 100. The audible content may be music, speech, alarms, tones, or other content typically projected from conventional speakers. In some embodiments, controller 106 is configured to perform the operations described below.

Controller 106 may include any combination of software and hardware. For example, controller 106 may include an application specific integrated circuit (ASIC), an electronic circuit, a processor (shared, dedicated, or group) and memory that execute one or more software or firmware programs, a combinational logic circuit, and/or other suitable components that provide the described functionality. In some embodiments, various operations performed by controller 106 may be stored as instructions on a non-transitory computer readable medium. The instructions may be executed to cause one or more processors to perform the operations described below. In some embodiments, controller 106 includes multiple separate control modules operating together to perform the operations described below. In some embodiments, controller 106 is integrated with other controllers in aircraft 100, such as a flight control computer of aircraft 100.

Sensors 108 include alarm sensors, proximity sensors, cabin management sensors, and other sensors suitable for aircraft 100, as will be appreciated by those with ordinary skill in the art. Remote communication device 109 may be a satellite transmitter/receiver, a wireless internet transmitter/receiver, a cellular communications transmitter/receiver, or other suitable remote communications device.

Figure 5:
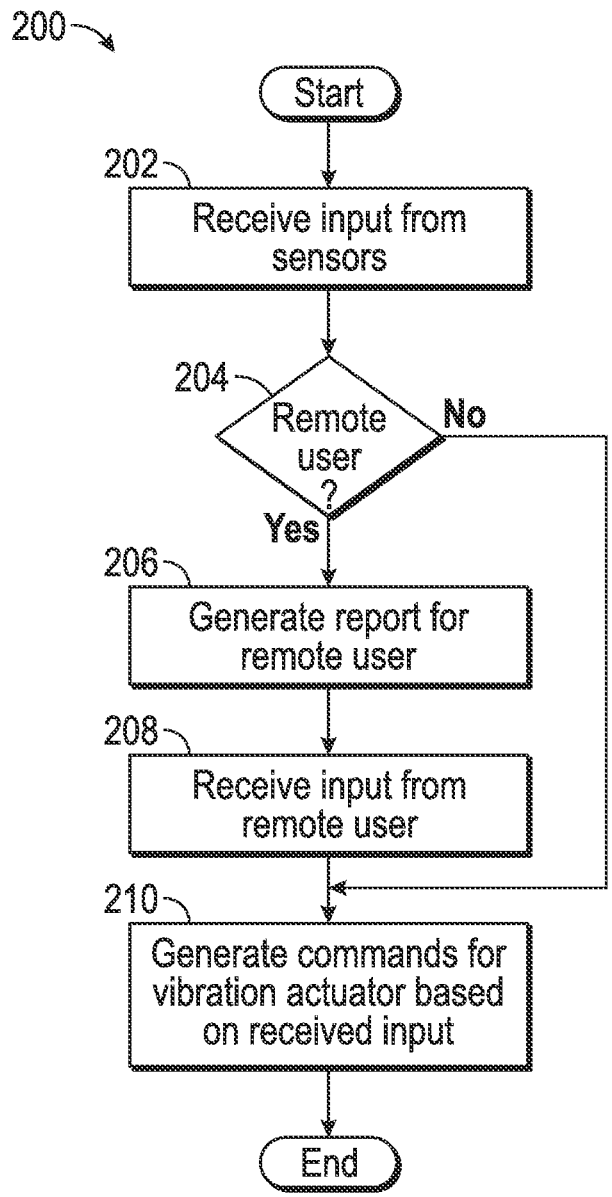
FIG. 5 is a flow diagram illustrating a non-limiting embodiment of a method performed by the controller of FIG. 1 in accordance with the teachings of the present disclosure.

Referring now to FIG. 5, a non-limiting embodiment of a method 200 for operating an aircraft exterior speaker system is shown in flow diagram form. Operations of method 200 are performed by controller 106. Controller 106 receives input from sensors 108 in operation 202. For example, controller 106 may receive input indicating a distance between a wall and a wingtip from a proximity sensor in operation 202.

Controller 106 determines whether there are remote users to be notified of the sensor input in operation 204. When there are remote users to be notified, controller 106 generates a report for the remote users in operation 206. For example, aircraft 100 may communicate with an application on a remotely located device (e.g, an aircraft owner's mobile phone) through satellite communications, wireless networking communications, or other suitable communications media. In some embodiments, controller 106 may generate an alarm notification to be transmitted to the remote user by remote communication device 109 in response to detecting intruders near aircraft 100.

Controller 106 receives input from the remote user in operation 208. For example, controller 106 may receive commands or voice data from the application on the mobile phone operated by the remote user. In some embodiments, the owner may speak into the mobile telephone in response to the generated report so that the owner can communicate with people located near aircraft 100 by sending audio signals to controller 106 through remote communication device 109. In some embodiments, the application may send location data to controller 106, which may be further configured to play music or greetings in response to receiving inputs commands from the application indicating that the remote user is approaching aircraft 100. In some embodiments, the music or greetings may be preselected by the owner of aircraft 100.

When there are no remote users or a remote user need not be notified of the sensor input, method 200 proceeds to operation 210. Controller 106 generates commands for vibration actuators 104 based on the received input in operation 210. For example, the generated commands may be based on the sensor input or the input from the remote user to project audio to the outside of aircraft 100. In some embodiments, controller 106 generates the commands based on the audio signals received from the remote user to facilitate communication between the remotely located user and people located near the aircraft.

In some embodiments, controller 106 is further configured as a security system and method 200 describes operation of the security system. For example, the security system may receive signals from sensors and systems in aircraft 100 to determine whether conditions in and around aircraft 100 indicate a risk of theft or damage, as will be appreciated by those with ordinary skill in the art. Controller 106 is further configured to generate the commands based on determinations by the security system in operation 210. For example, when controller 106 receives proximity sensor signals and determines that people are near aircraft 100 while the security system feature is active, controller 106 may generate commands for vibration actuator 104 to project audible content. Such audible content may be alarm tones, a prerecorded message, or other suitable warnings to be heard by potential thieves or vandals located outside aircraft 100.

In some embodiments, controller 106 is configured as a tug collision avoidance system and method 200 describes operation of the tug collision avoidance system. For example, controller 106 may be configured to interface with proximity sensors of the sensors 108. In some embodiments, the tug collision avoidance system is similar to the system described in co-pending U.S. patent application Ser. No. 14/599,758, filed Jan. 19, 2015, which is hereby incorporated by reference in its entirety. In some embodiments, controller 106 is configured to generate the commands based on proximity of a wingtip of aircraft 100 to an object, such as a wall of a hangar. Accordingly, the tug driver may be provided with aural towing warnings without need of any further equipment. For example, controller 106 may determine a distance between the wing tip and the wall. Controller 106 may then generate commands to project speech that indicates the distance (e.g., "five feet," "two inches," etc.) or to project tones or beeps at intervals dictated by the distance.

In some embodiments, controller 106 is further configured to receive signals from a pilot headset and to generate the commands based on the signals received from the pilot headset. For example, a microphone on the pilot headset may be among the plurality of sensors 108 used by controller 106 in method 200. Pilots and ground crew often communicate on specified channels through headsets, but other personnel may be tuned to different channels on which the pilot is not broadcast. In such situations when the pilot sees a pending collision or dangerous situation, the pilot may broadcast warnings or instructions through exterior speaker portions 118. In some embodiments, the pilot may have a separate button or input device that generates a warning or alarm sound from exterior speaker portions 118.

In some embodiments, controller 106 is configured to generate the commands based on maintenance instructions to be conveyed to ground crew during maintenance operations. For example, some hatches and hose connections require opening/closing procedures unique to a specific aircraft model that are not always known or intuitive for the ground crew. Conventional procedures involve searching the aircraft manual to identify these unique procedures. By announcing these instructions from the exterior speaker portions 118, such additional searching may be reduced or eliminated.

In some embodiments, controller 106 is further configured as a cabin management system that detects the power state of devices and systems on the aircraft. For example, controller 106 may be configured to receive a signal from the coffee maker or the interior cabin lights indicating whether the coffee maker or interior cabin lights are powered on or off. Controller 106 may then be further configured to generate the commands to announce which of the devices and systems are in an "on" power state in response to detecting an occupant exiting the aircraft. For example, controller 106 may detect the absence of occupants in the aircraft by occupancy or motion sensors, and may generate the commands to announce that the coffee maker has been left in a powered on state as the door of aircraft 100 is closed.

In some embodiments controller 106 is further configured to generate the commands based on active noise cancelation. For example, noise cancelation of jet engine noise using exterior speaker portion 118 at engine cowlings 116 may be desirable to reduce noise generated by aircraft 100 to areas nearby airports during takeoff and landing. Additional active noise cancelation of airframe noise may also be incorporated, such as with exterior speaker portion 118 at wing-to-body fairing 110. In some embodiments, controller 106 is further configured to generate the commands based on masking noise to be generated by exterior speaker portions 118.

In some embodiments, controller 106 is further configured to generate the commands based on bird deterrent sounds to be projected from the exterior surface of exterior speaker portion 118. The bird deterrent sounds deter birds from sitting on aircraft 100 while parked or from flying in a path of aircraft 100 while in flight. For example, controller 106 may be configured to play sounds from exterior speaker portions 118 at regular intervals or in response to detection of birds by sensors 108. During flight, controller 106 may be configured to play sounds from exterior speaker portions 118 based on avian radar components within sensors 108.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
   an outer skin membrane having an exterior surface that defines an exterior boundary of the aircraft;
   a wing having a wingtip;
   a vibration actuator coupled for common vibration with the outer skin membrane; and
   a controller operatively coupled with the vibration actuator and configured to generate a command for the vibration actuator based on audible content to be projected from the exterior surface and further configured to transmit the command to the vibration actuator, the vibration actuator being configured to vibrate in response to receiving the command, wherein the controller is further configured to generate the command based on proximity of the wingtip to an object for providing a tug driver with towing warnings.

2. The aircraft of claim 1, wherein the outer skin membrane forms at least part of an engine cowl, a wing-to-body fairing, a horizontal stabilizer, a wing of the aircraft, or combinations thereof.

3. The aircraft of claim 1, wherein the outer skin membrane has an interior surface, and wherein the vibration actuator is fastened to the interior surface of the outer skin membrane.

4. The aircraft of claim 1, wherein the vibration actuator is an electromagnetic driver or a piezo electric actuator.

5. The aircraft of claim 1, wherein the controller is further configured to generate the commands based on maintenance instructions to be conveyed to ground crew during maintenance operations.

6. The aircraft of claim 1, wherein the vibration actuator is coupled to the outer skin membrane at an engine cowling, and wherein the controller is further configured to generate the commands based on active noise cancelation of noise generated by a jet engine of the aircraft.

7. An aircraft, comprising:
   an outer skin membrane having an exterior surface that defines an exterior boundary of the aircraft, wherein the outer skin membrane is a composite material formed from a honeycomb structure;
   a vibration actuator coupled for common vibration with the outer skin membrane, wherein the vibration actuator is embedded in a cell or cells of the honeycomb structure; and
   a controller operatively coupled with the vibration actuator and configured to generate a command for the vibration actuator based on audible content to be projected from the exterior surface and further configured to transmit the command to the vibration actuator, the vibration actuator being configured to vibrate in response to receiving the command.

8. An aircraft, comprising:
   an outer skin membrane having an exterior surface that defines an exterior boundary of the aircraft;
   a vibration actuator coupled for common vibration with the outer skin membrane; and
   a controller operatively coupled with the vibration actuator and configured to generate a command for the vibration actuator based on audible content to be projected from the exterior surface and further configured to transmit the command to the vibration actuator, the vibration actuator being configured to vibrate in response to receiving the command, wherein the controller comprises a component of a security system, and wherein the controller is further configured to generate the command based on a threat detected by the security system.

9. An aircraft, comprising:
   an outer skin membrane having an exterior surface that defines an exterior boundary of the aircraft;
   a vibration actuator coupled for common vibration with the outer skin membrane;
   a controller operatively coupled with the vibration actuator and configured to generate a command for the vibration actuator based on audible content to be projected from the exterior surface and further configured to transmit the command to the vibration actuator, the vibration actuator being configured to vibrate in response to receiving the command; and a remote communication device operatively coupled with a remotely located device operated by a remotely located user, and wherein the controller is further configured to generate the command based on input from the remote communication device to facilitate communication between the remotely located user and people located near the aircraft.

10. An aircraft, comprising:

an outer skin membrane having an exterior surface that defines an exterior boundary of the aircraft;

a vibration actuator coupled for common vibration with the outer skin membrane; and a controller operatively coupled with the vibration actuator and configured to generate a command for the vibration actuator based on audible content to be projected from the exterior surface and further configured to transmit the command to the vibration actuator, the vibration actuator being configured to vibrate in response to receiving the command, wherein the controller is further configured as a cabin management system that detects a power state of devices and systems on the aircraft, and wherein the controller is further configured to generate the commands to announce which of the devices and systems are in an "on" power state in response to detecting an occupant exiting the aircraft.

11. The aircraft of claim 10, further comprising a pilot headset microphone operatively coupled with the controller, and wherein the controller is further configured to receive signals from the pilot headset microphone and to generate the command based on the signals received from the pilot headset microphone.

* * * * *